US008413253B2

(12) United States Patent
Kadam

(10) Patent No.: US 8,413,253 B2
(45) Date of Patent: Apr. 2, 2013

(54) PROTECTING PERSISTENT SECONDARY PLATFORM STORAGE AGAINST ATTACK FROM MALICIOUS OR UNAUTHORIZED PROGRAMS

(75) Inventor: Akshay R. Kadam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 12/655,466

(22) Filed: Dec. 30, 2009

(65) Prior Publication Data
US 2011/0162077 A1    Jun. 30, 2011

(51) Int. Cl.
*G06F 21/00* (2006.01)
(52) U.S. Cl. .......................................................... 726/26
(58) Field of Classification Search ............... 726/26–30
See application file for complete search history.

(56) References Cited

U.S. PATENT DOCUMENTS

| | | | | |
|---|---|---|---|---|
| 7,549,044 B2* | 6/2009 | Lee et al. | ...................... | 713/167 |
| 7,743,239 B2* | 6/2010 | Ahlquist | .......................... | 713/1 |
| 8,010,790 B2* | 8/2011 | Lee et al. | ...................... | 713/167 |
| 2005/0210211 A1* | 9/2005 | Kodama | ....................... | 711/163 |

\* cited by examiner

*Primary Examiner* — Kambiz Zand
*Assistant Examiner* — John B King
(74) *Attorney, Agent, or Firm* — Schwabe, Williamson & Wyatt, P.C.

(57) ABSTRACT

A high integrity storage manager protects critical system files by maintaining a list of protected disk blocks in hardware, such as in a memory of a microcontroller. The memory is inaccessible to software running on a host system comprising the microcontroller. This list of protected disk blocks is protected as "read only" by the hardware so that no write operation issued by software running on the host platform can overwrite a protected disk block. The high integrity storage manager intercepts write operations issued by applications via the operating system and file system running on the host processor and compares the disk blocks targeted by those write operations to the list of protected disk blocks. A write operation that would overwrite a disk block in the list of protected disk blocks is prevented from completion. Other embodiments are described and claimed.

19 Claims, 5 Drawing Sheets

PROTECTING PERSISTENT SECONDARY PLATFORM STORAGE AGAINST ATTACK FROM MALICIOUS OR UNAUTHORIZED PROGRAMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to protection of data storage.

BACKGROUND

Malware is software that the owner/user of the computer system does not install himself. Malware typically enters the computer system without the knowledge of the user—generally via the network interface and sometimes through software or other digital data stored on removable media such as a CD-ROM or USB pen-drive. The intent of malicious software is to damage the user's system by deleting important data or deleting important operating system and application executable files rendering the infected system unable to operate. If user data (such as photos, emails, documents) are deleted and the user does not have a backup of the lost data, that user data may never be recovered. If operating system or application files are deleted, the system may be recovered by re-installing the damaged or deleted software. In either case, malware causes significant damage in terms of loss of productivity as well as user data. Malware is becoming more dangerous in that the software may not noticeably damage the system but rather remains hidden (deleting important files would immediately alert the user to the presence of the malware) and attempts to steal important information such as credit card numbers, usernames and passwords, and so on.

Malware typically enters the system via the internet (i.e., via the network interface). Upon entering the system, malware first attempts to become 'resident' on the system by writing a copy of malware system files to the secondary storage or hard disk drive of the system. Once a copy is made in persistent storage, the malicious software remains on the computer system until the malicious software is found and deleted (which is what most anti-virus software does). However, becoming persistent on the platform does not guarantee that the malicious software will be activated (or loaded) if the computer is rebooted. To ensure boot-time activation in addition to becoming persistent, the malicious software inserts commands into the startup (or boot) sequence of the computer. Once this is successfully accomplished, the malicious software is re-activated every time the computer is switched on, surviving reboots/power-cycles.

Malware 'hook' into the boot sequence of the system by modifying or 'attaching' malware software files and/or commands to operating system executable files that are always loaded and activated during the OS boot process. An alternative, frequently used technique is for malware to modify system configuration files that control the boot processes by listing the malware files as 'legitimate' system files to be loaded at boot time. Once these operating system executable files and/or system configuration files are corrupted, malware can establish an environment in which protections normally provided by the operating system are circumvented.

DETAILED DESCRIPTION

Embodiments provide protection of persistent secondary platform storage from updates by malicious or unauthorized programs. A read-only policy for critical system files is enforced in hardware, thereby preventing malware from modifying critical system files and from inserting files or commands into the system boot process. The integrity of system files is maintained, thereby resulting in successfully preventing viruses from becoming persistent on the system.

Although malware may enter the system and reside in primary memory (i.e. volatile RAM), a system reboot (power-cycle) will ensure that the malware will not be re-activated. A reboot of the host system will cause malware, if present, to be purged from the system. Malware that has infected a system operating in accordance with the present invention at run-time may be 'cleaned' or removed by simply rebooting the system.

A high integrity storage manager protects critical system files by maintaining a list of protected disk blocks in hardware. This list of protected disk blocks is protected as "read only" by the hardware so that no write operation issued by software running on the host platform can overwrite a protected disk block. The high integrity storage manager intercepts write operations issued by applications via the operating system and file system running on the host processor and compares the disk blocks targeted by those write operations to the list of protected disk blocks. A write operation that would overwrite a disk block in the list of protected disk blocks is prevented from completion.

Figure 1:
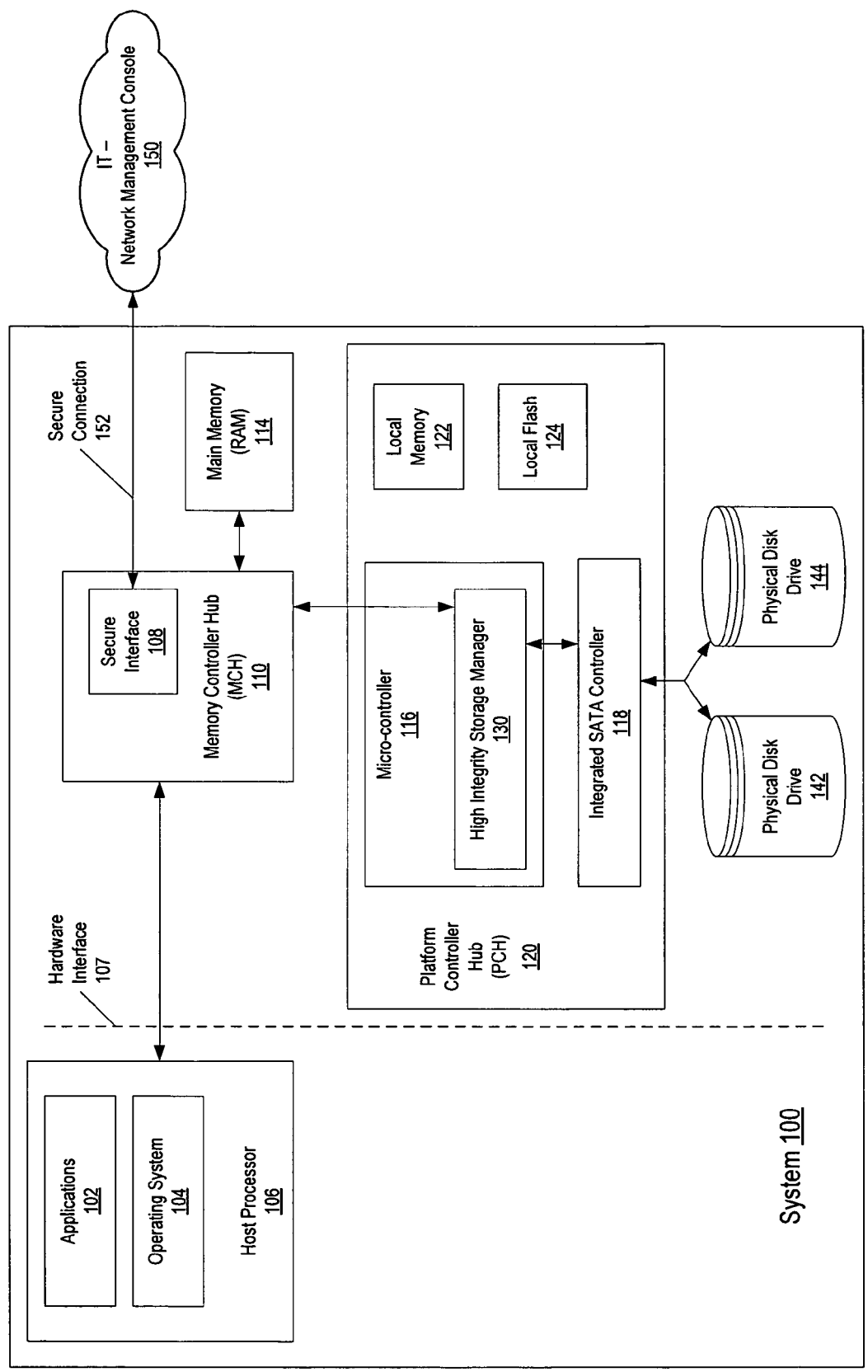
FIG. 1 is a block diagram illustrating one embodiment of a system to provide protection of persistent secondary platform storage against updates by malicious or unauthorized programs.

FIG. 1 shows a system 100 configured in accordance with one embodiment of the invention. System 100 includes a host processor 106 running an operating system 104 and applications 102. Software running on host processor 106 uses hardware interface 107 to communicate with hardware such as memory controller hub (MCH) 110 and platform controller hub (PCH) 120. Memory controller hub (MCH) 110 interfaces with a main memory 114, which is a volatile Random Access Memory, or RAM. Memory controller hub (MCH) 110 further includes a secure interface 108, which enables an enterprise IT network management console 150 that is external to system 100 to securely configure and manage system 100 as an enterprise resource via a secure connection 152. Secure interface 108 may be provided, for example, using Intel® vPro™ technology provided by Intel Corporation.

System 100 further includes a platform controller hub (PCH) 120 configured to provide hardware controls for writing data to physical disk drives 142 and 144. In one embodiment, a high integrity storage manager 130 resides as firmware within a microcontroller 116 component of platform controller hub (PCH) 120. Platform controller hub 120 further contains associated private local memory 122, which may be a static Random Access Memory (SRAM) and is inaccessible to software running on host processor 106. Platform controller hub 120 further contains private local FLASH memory 124, also inaccessible to software running on host processor 106, and an integrated SATA (Serial Advanced Technology Attachment) controller 118.

High integrity storage manager 130 within microcontroller 116 captures storage input/output commands issued by applications 102 to operating system 104 running on host processor 106. High integrity storage manager 130 also captures responses to storage commands and data transfers (using direct memory access (DMA) commands) issued by integrated SATA controller 118. The operation of high integrity storage manager 130 in processing input/output commands is described further with reference to FIG. 3.

Figure 2:
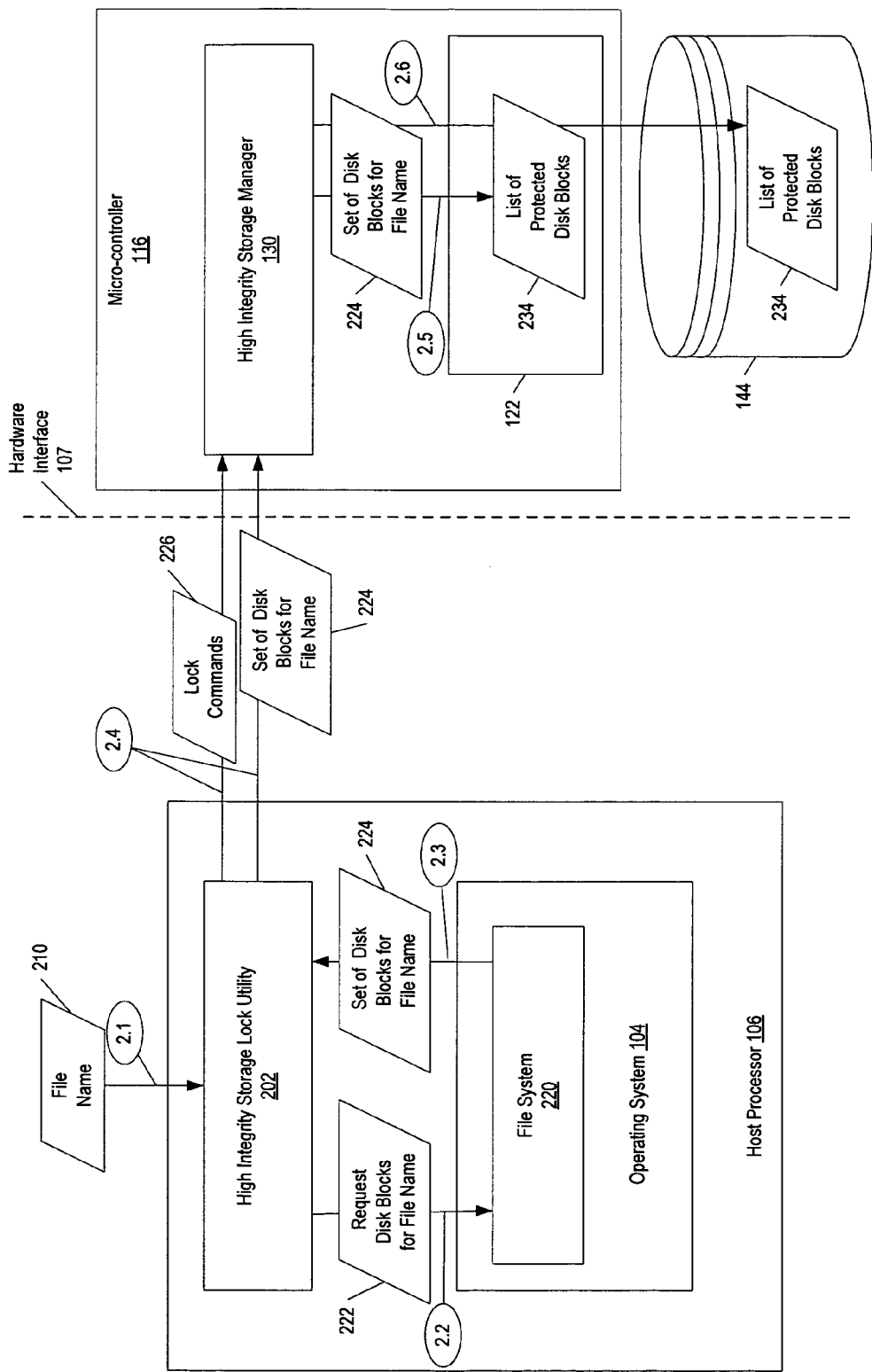
FIG. 2 is a block diagram showing operation of selected components of the system of FIG. 1 in protecting a file stored in persistent secondary platform storage.

FIG. 2 is a block diagram showing operation of selected components of the system of FIG. 1 in protecting a file stored in persistent secondary platform storage. A file is protected using hardware to enforce a "read-only" policy for a set of disk blocks storing portions of the file on a disk drive. Updates to the set of disk blocks are prevented by any software running on the host processor, including the file system and operating system.

Instructions for high integrity storage manager 130 may be loaded as firmware on microcontroller 116. In one embodiment, high integrity storage manager 130 interacts with high integrity storage lock utility 202, which runs on host processor 106. Instructions for high integrity lock utility 202 may be loaded into main memory (RAM) 114 of FIG. 1 and may be initially provisioned via IT—network management console 150 of FIG. 1. Alternatively, instructions for high integrity lock utility 202 may be loaded as firmware on microcontroller 116 along with the instructions for high integrity storage manager 130 and provided to host processor 106 when lock functionality is needed. To protect a file, the high integrity lock utility 202 obtains the list of corresponding disk blocks from the file system 220 and then communicates this information to high integrity storage manager 130 running in microcontroller 116. These actions are described in further detail below.

High integrity storage lock utility 202 may be invoked, for example, by a lock request issued by IT network management console 150 via secure interface 108. Alternatively, high integrity storage lock utility 202 may be invoked by a user of system 100 when the user requests high integrity storage protection for protection of the user's data files. System files for the high integrity storage lock utility 202 itself may also be locked—i.e., the disk blocks for the system files for the high integrity storage lock utility 202 may be included in the list of protected disk blocks—so that malware cannot infect the high integrity storage lock utility 202.

In one embodiment, high integrity storage lock utility 202 interacts with file system 220 running under control of operating system 104 on host processor 106. A file system such as file system 220 interacts with most modern general purpose operating systems such as operating system 104 to provide file-handling functionality to systems such as system 100. Examples of file systems are NTFS for the Microsoft Windows NT operating system (as well as for other versions of the Microsoft Windows operating system) and Ext2/3 for the Linux operating system. A file system is responsible for managing files that are stored on secondary, persistent storage on the platform. Applications such as applications 102 of FIG. 1 read and write to files using services provided by the file system.

A file system such as file system 220 allows applications such as applications 102 of FIG. 1 to read and write data to persistent storage at the granularity of a single byte. However, most hard disk drives such as physical disk drives 142 and 144 of FIG. 1 operate at the granularity of 'blocks,' which are typically 512 bytes in size. File systems implement a read-modify-write operation to provide a more convenient byte-granular access for applications to use. Consequently, the file system maps each file stored on the disk to a set of one or more whole disk blocks.

A file system such as file system 220 is responsible for managing the mapping of files to disk blocks. This mapping (and associated information) is stored by the file system on the disk along with the files and is referred to as 'file system metadata'. This mapping information is used by the file system to translate file read/write requests to disk block read/write requests. By protecting the set of disk blocks corresponding to a file from being overwritten, the file system protects the entire file.

Referring again to FIG. 2, a file to be protected from malware, such as an executable operating system file, may be established as a read-only file by invoking high integrity storage lock utility 202. For example, IT network management console 150 of FIG. 1 may invoke high integrity storage lock utility 202 by issuing a lock request via secure interface 108 of FIG. 1. The name of the file to be protected, file name 210, is provided as input to high integrity storage lock utility 202, as shown in action 2.1. One of skill in the art will understand that multiple file names may be provided to high integrity storage lock utility 202.

In action 2.2, high integrity storage lock utility 202 sends a request 222 for the disk blocks corresponding to file name 210 to file system 220. In action 2.3, file system 220 returns the set of disk blocks 224 corresponding to file name 210 to high integrity storage lock utility 202.

In action 2.4, high integrity storage lock utility 202 sends lock commands 226 and the set of disk blocks 224 for file name 210 to high integrity storage manager 130. High integrity storage lock utility 202 issues a lock command to request that a file be "locked" as read-only by high integrity storage manager 130. One of skill in the art will understand that the set of disk blocks 224 for file name 210 may be provided separately from lock commands 226 as shown, or the set of disk blocks may be provided instead as parameters to the lock commands 226, with a separate lock command for each disk block to be protected.

In action 2.5, high integrity storage manager 130 adds the set of disk blocks 224 corresponding to file name 210 to a list of protected disk blocks 234 stored in local memory 122 within microcontroller 116. As previously mentioned, local memory 122 within microcontroller 116 is inaccessible to software running on host processor 106 and thus is protected from tampering by malware. This list of protected disk blocks 234 may further be stored persistently by high integrity storage manager 130, such as in a hidden area of physical disk drive 144, as shown in action 2.6.

Figure 3:
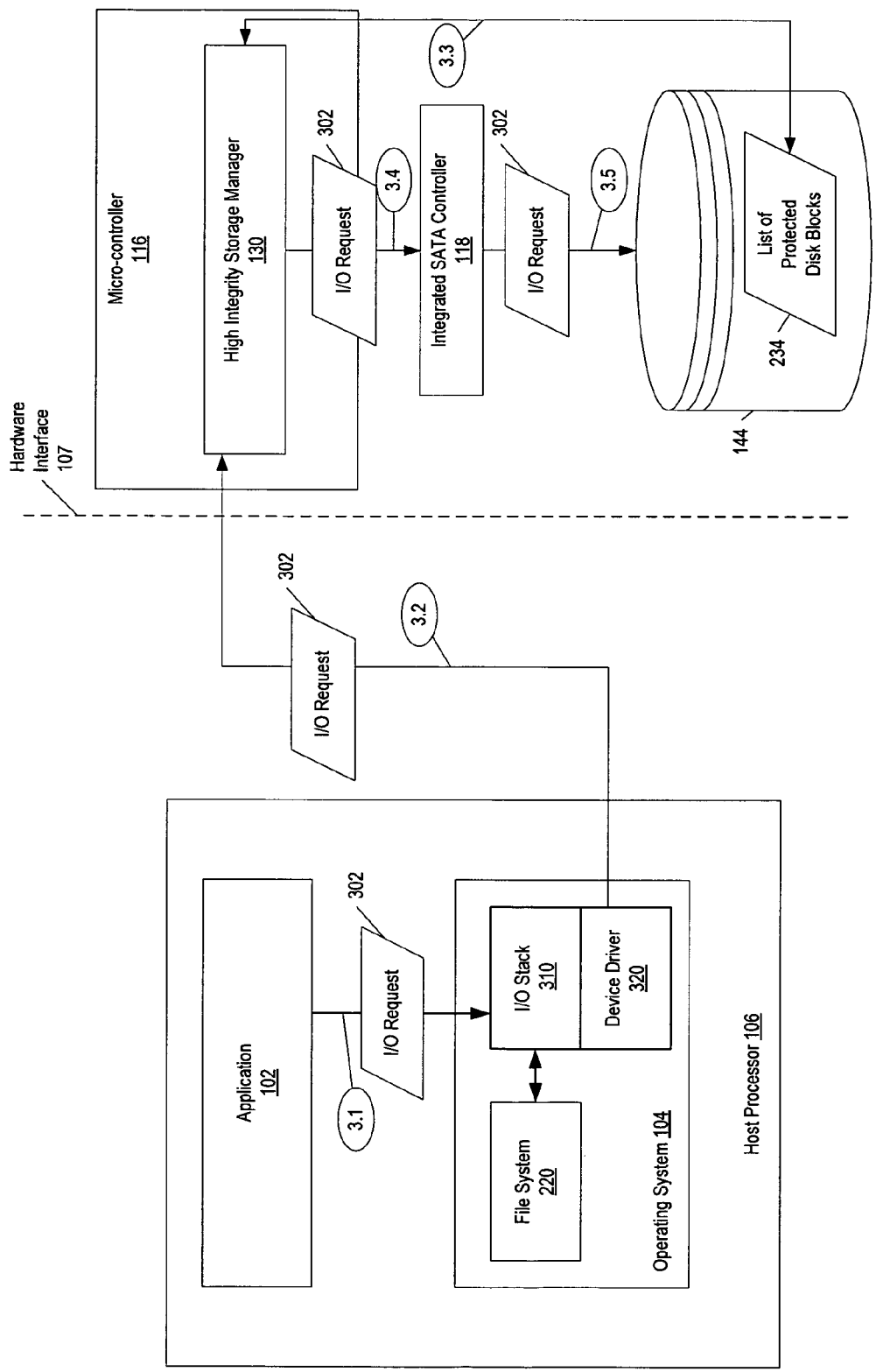
FIG. 3 is a block diagram showing operation of selected components of the system of FIG. 1 in processing a write command issued by software running on the platform.

FIG. 3 is a block diagram showing operation of selected components of the system of FIG. 1 in processing a write command issued by software running on the platform. In action 3.1, application 102 issues an I/O request 302. I/O request 302 is processed by an I/O stack 310 running under operating system 104. I/O stack 310 may interact with file system 220 and device driver 320 to process the I/O request 302. In action 3.2, device driver 320 issues the I/O request 302 via hardware interface 107 to microcontroller 116. When hardware interface 107 receives I/O request 302, high integrity storage manager 130 inspects the contents of I/O request 302.

High integrity storage manager 130 may maintain metadata describing disk blocks of the physically attached disk(s), such as disk blocks of physical disk drives 142 and 144, which are to be write-protected. High integrity storage metadata, such as the list of protected disk blocks 234, may be maintained within local memory 122 of platform controller hub 120 (as shown previously with reference to FIG. 2 but not shown in FIG. 3) and may be made persistent in hidden areas of the disk reserved for high integrity storage manager 130, as shown by list of protected disk blocks 234 stored in physical disk drive 144.

In action 3.3, high integrity storage manager 130 checks this metadata, shown as list of protected disk blocks 234 stored in physical disk drive 144, to see whether I/O request 302 is targeted to write to a disk block that appears in the list of protected disk blocks 234. Write operations directed to a disk block on list of protected disk blocks 234 will be denied by high integrity storage manager 130. In the example shown in FIG. 3, none of the disk blocks targeted by I/O request 302 are contained in the list of protected disk blocks 234.

Finding that I/O request 302 does not attempt to overwrite any of the disk blocks in list of protected disk blocks 234, in action 3.4, high integrity storage manager 130 forwards I/O request 302 to integrated SATA controller 118 for further processing. In action 3.5, integrated SATA controller 118 performs I/O request 302, thereby updating data stored on physical disk drive 144.

Responses to an I/O request that are generated by integrated SATA controller 118 also may be inspected by the high integrity storage manager 130 component of microcontroller 116. These responses may be modified if required, and forwarded to operating system 104 running on host processor 106. DMA requests (such as fill/drain requests) generated by integrated SATA controller 118 are also inspected and modified if required by the high integrity storage manager 130 before they are forwarded upstream to the memory controller hub (MCH) 110 of FIG. 1 for further processing.

By enforcing a "read-only" policy for critical system files, and disallowing updates to those critical system files even by the operating system and file system running on host processor 106, high integrity storage manager 130 protects critical system files from being overwritten.

Figure 4:
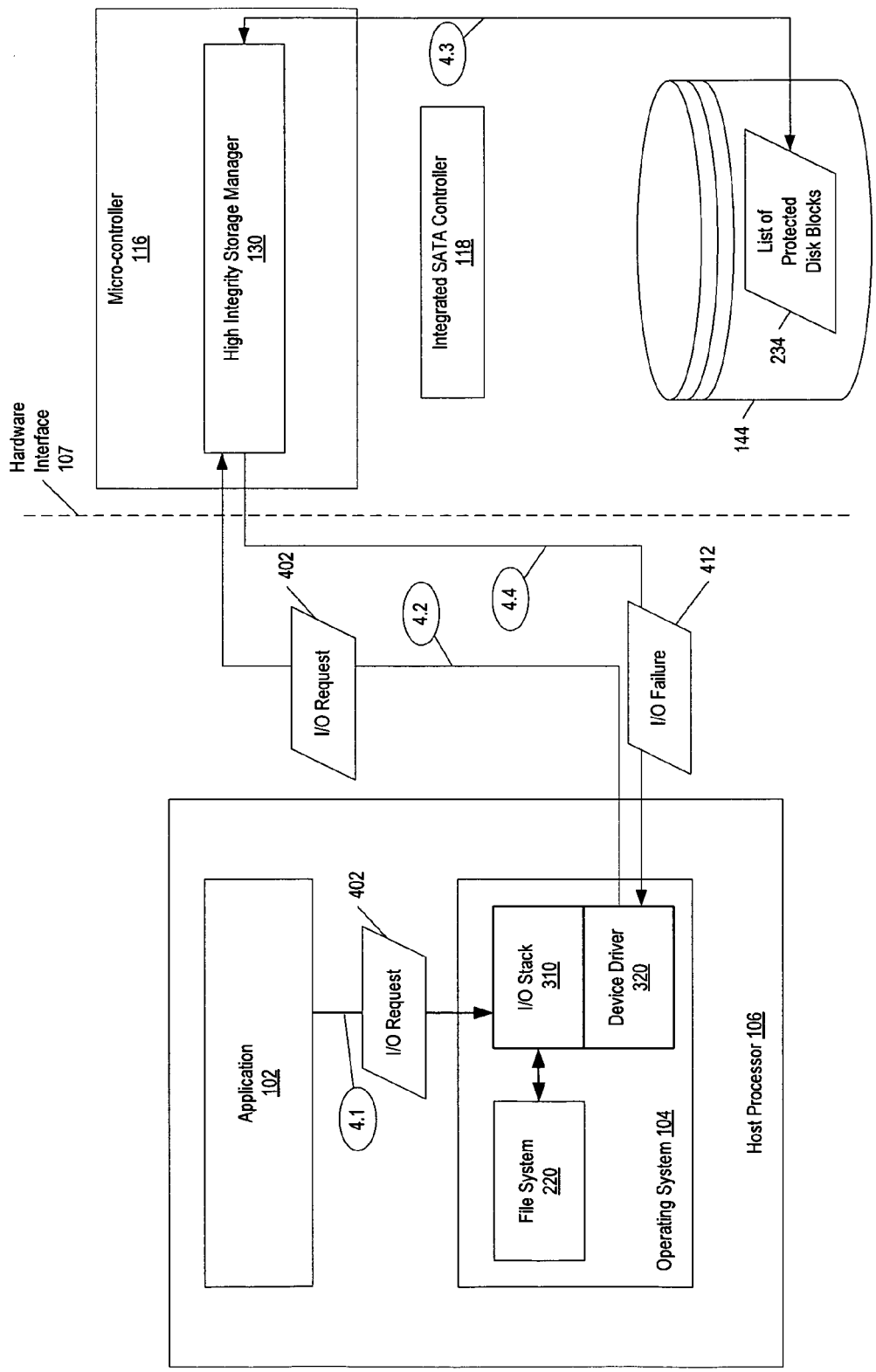
FIG. 4 is a block diagram showing operation of selected components of the system of FIG. 1 in preventing a write command issued by malware running on the platform.

FIG. 4 is a block diagram showing operation of selected components of the system of FIG. 1 in preventing a write command issued by malware running on the platform. In action 4.1, application 102 issues an I/O request 402. In this example, application 102 is malware and represents a compromised operating system in-memory runtime image. I/O request 402 is an attempt to overwrite the persistent disk image of this critical operating system file with a modified version of the operating system file. I/O request 402 is processed by an I/O stack 310 running under operating system 104. I/O stack 310 may interact with file system 220 and device driver 320 to process the I/O request 402. In action 4.2, device driver 320 issues the I/O request 402 via hardware interface 107 to microcontroller 116. When hardware interface 107 receives I/O request 402, high integrity storage manager 130 inspects the contents of I/O request 402.

In action 4.3, high integrity storage manager 130 checks high integrity storage metadata, shown as list of protected disk blocks 234 stored in physical disk drive 144, to see whether I/O request 402 is targeted to write to a disk block that appears in the list of protected disk blocks 234.

Finding that I/O request 402 does attempt to overwrite a disk block in list of protected disk blocks 234, in action 4.4, high integrity storage manager 130 sends an I/O failure notification 412 back to device driver 320. I/O request 402 is not forwarded to integrated SATA controller 118 and has been prevented by the hardware from affecting data stored in physical disk drive 144.

Using the techniques described herein, the high integrity storage manager of the present invention enforces in hardware a read-only access policy for a specified set of files. Locking all critical operating system executable and configuration files as protected will prevent malware from becoming persistent on the system.

However, security patch and software upgrade operations need to legitimately modify system executables and configuration files. Since the high integrity storage manager prevents modification of these files by any host based software, patch utilities and software upgrade programs running on the host processor will be unable to perform these updates.

The high integrity storage manager of the present invention addresses the need for updating and patching critical system files by allowing a file to be 'unlocked' via a non-host based interface such as secure interface 108 of FIG. 1. As mentioned with reference to FIG. 1, secure interface 108 enables an enterprise IT network management console 150 that is external to system 100 to securely configure and manage system 100 as an enterprise resource via a secure connection 152. Secure interface 108 may be provided, for example, using Intel® vPro™ technology provided by Intel Corporation. Since patch and software upgrade operations are part of the manageability aspect of system operation, secure interface 108 provides a path for unlock operations to be issued to the system.

The 'unlock' operation removes hardware protections for the specified file. Once protections have been removed, software patch and upgrade agents may modify the file after which the file may be re-locked.

As described earlier with reference to FIG. 3, software running on the host processor 106 is capable of performing regular data I/O operations (read/write) to the disk as well as issuing one-way lock operations to the high integrity storage manager 130 to protect or lock files. The unlock operation is available only to IT network management console 150 via secure interface 108 and is not accessible to software running on host processor 106.

Figure 5:
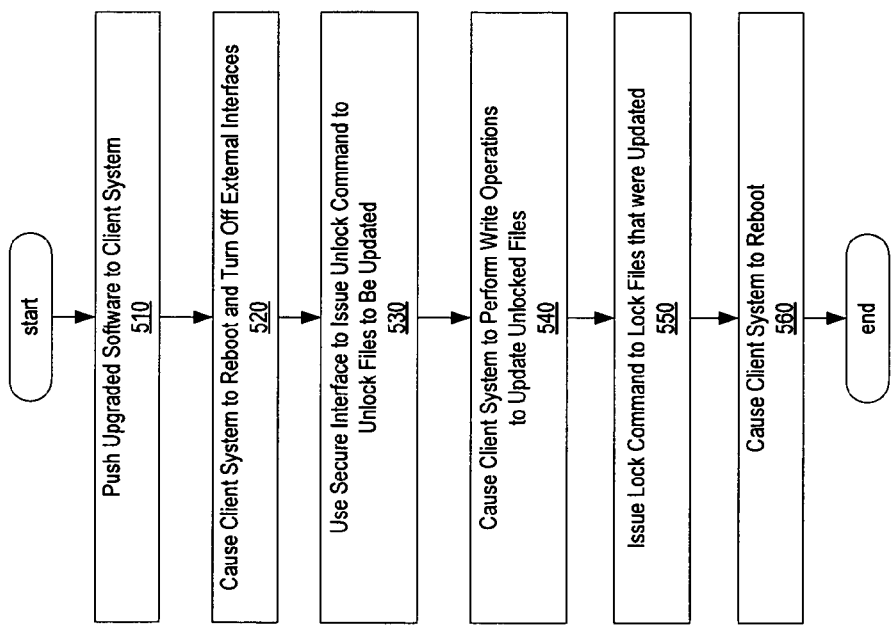
FIG. 5 is a flowchart of a method for allowing updates to a file protected in accordance with one embodiment of the present invention.

FIG. 5 is a flowchart of a method for allowing updates to a file protected by high integrity storage manager 130. In "Push Upgraded Software to Client System" step 510, IT network management console 150 pushes the software patch or upgrade package to the client system 100 via secure interface 108 in accordance with the normal patch or upgrade process. Typically, the patches are 'applied' only after the entire patch has been downloaded to the client system 100.

In "Cause Client System to Reboot and Turn Off External Interfaces" step 520, IT network management console 150 causes the client system 100 to reboot to ensure that memory-resident malware, if present, is purged from main memory 114 of system 100. Upon reboot, system 100 initializes in a clean state since critical system files are locked and protected from modification. In addition, external interfaces (such as network, USB flash drives, CD-ROM drives, and other interfaces) are disabled so that system 100 is completely isolated from the outside world. Disabling these external interfaces will ensure that malware cannot enter system 100 from the outside during the vulnerable patch process described with reference to steps 530 through 550 below.

After the patch has been downloaded to the system, IT network management console 150 transitions to "Use Secure Interface to Issue Unlock Command to Unlock Files to Be Updated" step 530. IT network management console 150 issues the unlock command via secure interface 108 to remotely unlock the critical locked files that need to be modified by the patch process.

When the files have been unlocked, IT network management console 150 transitions to "Cause Client System to Perform Write Operations to Update Unlocked Files" step 540. In step 540, IT network management console 150 causes the patch to be applied by running the patch utility. Write operations to critical files issued by the patch utility will be allowed by high integrity storage manager 130 since the file(s) have been unlocked in "Use Secure Interface to Issue Unlock Command to Unlock Files to Be Updated" step 530.

On completion of the patch operation, IT network management console 150 transitions to "Issue Lock Command to Lock Files that were Updated" step 550. All critical files are re-locked. This re-lock operation may be either issued by the patch utility itself or, like the unlock operation, the lock command may be issued by IT network management console 150 via secure interface 108.

After the files are re-locked, IT network management console 150 transitions to "Cause Client System to Reboot" step 560. IT network management console 150 causes the client system 100 to be rebooted to ensure that all critical system files are locked.

The high integrity storage manager of the present invention enforces a read-only policy for critical system files in hardware, in contrast to existing solutions that provide read-only protection in software. For example, some file systems provide a read-only attribute for each file. The policy enforcement associated with this attribute is provided by the file system itself, which is a software layer. Most popular anti-virus software also provides a mechanism that allows certain directories and files to be marked as read-only, denying malware the ability to access these areas of the disk. Anti-virus solutions typically enforce these protections under the operating system layer using low-level application program interfaces. Because these are software-based solutions, the file system or anti-virus software that is enforcing the protection is running in the same domain or protection level as the attacker (i.e. the malware). Since both defender and attacker are running in the same protection level, the attacker finds a way to subvert the defender. This problem has been repeated in the past by malware being able to subvert (newly implemented) operating system and anti-virus protections.

The high integrity storage manager of the present invention implements these protections in hardware, behind a well defined hardware interface. Since the protections provided by the present invention are enforced in a protection domain that is isolated from the host system, software running on the host is unable to subvert the protections provided.

The high integrity storage manager of the present invention differs from products known as write blockers that are used in the computer forensics field to prevent any writes from reaching an attached hard disk drive. This technology is used by law enforcement agencies while exploring a suspect's computer (hard disk), looking for information. In this scenario, absolutely no modifications should be made to the hard disk under inspection. To ensure that the hard disk remains in its original state, a device known as a write-blocker is inserted between the host computer and the hard disk device. The write blocker denies any write operation issued by the host computer, preventing intentional or accidental modification of data on the hard disk drive under inspection. The goal of write-blocker devices is not to prevent malware from becoming persistent on a system but rather to ensure that data is not accidentally lost. The high integrity storage manager of the present invention allows legitimate write operations to the disk, as well as updates to software under controlled conditions via a secure interface, rather than unilaterally preventing all write operations.

In the following description, numerous specific details such as system configurations, particular order of operations for method processing, and implementation details for embodiments of a high integrity storage manager have been set forth to provide a more thorough understanding of embodiments of the present invention. It will be appreciated, however, by one skilled in the art that the invention may be practiced without such specific details. Additionally, some well-known structures, circuits, and the like have not been shown in detail to avoid unnecessarily obscuring the present invention.

Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing high integrity storage. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented-method comprising:

maintaining, on a host system, a list of protected disk blocks in a memory of a microcontroller of the host system, wherein the memory is inaccessible to software running on a processor of the host system;

intercepting, on the host system, a write command sent by the software running on the processor to a storage controller of the host system;

inspecting, on the host system, the write command to determine whether the write command attempts to write to a disk block on the list of protected disk blocks;

causing, on the host system, the write command to fail if a result of the determination indicates the write command attempts to write to a disk block on the list of protected disk blocks; and in response to receiving, on the host system, a request to update a requested disk block after the requested disk block has been removed from the list of protected disk blocks in response to a remove request received via a secure interface of the host system, causing, on the host system, external interfaces of the host system for accessing the host system to be disabled; and allowing, on the host system, the requested disk block to be updated after the external interfaces have been disabled.

2. The method of claim 1 further comprising:

identifying, on the host system, a set of disk blocks corresponding to at least a portion of a file to be protected; and adding the set of disk blocks to the list of protected disk blocks to enable at least the portion of the file to be protected.

3. The method of claim 1 further comprising:

receiving, by the host system, the request to remove the requested disk block from the list of protected disk blocks via the secure interface; and removing, by the host system, the requested disk block from the list of protected disk blocks in response to the request.

4. The method of claim 3 wherein
the secure interface is inaccessible to the software running on the processor.

5. The method of claim 3 wherein
the secure interface is accessible only to a management console that is external to the host system.

6. The method of claim 3 further comprising:
adding the requested disk block back into the list of protected disk blocks in response to a request received via the secure interface, after the requested disk block is updated.

7. A system comprising:
a processor;
a microcontroller,
having a storage controller and a storage integrity manager, coupled with the processor; and
a secure interface coupled with the processor and the microcontroller, and configured to provide secure access to the system;
wherein the storage integrity manager is configured to:
maintain, within the microcontroller, a list of protected disk blocks of a disk storage accessed through the storage controller;
intercept a write command sent by software running on the processor to the storage controller;
inspect the write command to determine whether the write command attempts to write to a disk block on the list of protected disk blocks;
cause the write command to fail if a result of the determination indicates the write command attempts to write to a disk block on the list of protected disk blocks; and
wherein the secure interface is configured to enable a requested disk block on the list of protected disk block to be removed from the list of protected disk blocks, to enable content in the requested disk block to be updated, and to enable the requested disk block to be added back to the list of protected disk blocks after content in the requested disk block has been updated,
wherein the system, in addition to the microcontroller, includes a processor configured to execute an operating system, and an external interface for an external server to access the system, wherein the secure interface and the external interface are different interfaces.

8. The system of claim 7 further comprising:
a second memory, wherein one of the memory and the second memory comprises instructions configured to:
determine a file targeted by the write command; and
identify a set of disk blocks corresponding to the file.

9. The system of claim 8 wherein
one of the memory and the second memory comprises instructions configured to:
determine whether at least one disk block in the set of disk blocks is in the list of protected disk blocks; and
determine that the write command attempts to write to the disk block in the list of protected disk blocks when the at least one disk block is in the list of protected disk blocks.

10. The system of claim 8
wherein
one of the memory and the second memory comprises instructions configured to:
receive a request to remove the requested disk block from the list of protected disk blocks via the secure interface; and
remove the requested disk block from the list of protected disk blocks in response to the request.

11. The system of claim 7 wherein
the secure interface is inaccessible to software running on the processor.

12. The system of claim 7 wherein
the secure interface is accessible only to a management console that is external to the system.

13. The system of claim 8 wherein
one of the memory and the second memory further comprises instructions configured to:
add the requested disk block back into the list of protected disk blocks after the requested disk block is updated.

14. A non-transitory machine-accessible storage medium comprising instructions configured to enable a microcontroller of a host system, in response to execution of the instructions by the microcontroller, to:
maintain, within the microcontroller, a list of protected disk blocks of storage device accessed through a storage controller of the host system;
intercept a write command sent by software running on a processor of the host system to a storage controller;
inspect the write command to determine whether the write command attempts to write to a disk block on the list of protected disk blocks;
cause the write command to fail if a result of the determination indicates the write command attempts to write to a disk block on the list of protected disk blocks; and remove a requested block from the list of protected disk blocks, to enable content in the requested disk block to be updated, and add back the requested block to the list of protected disk blocks after content in the requested disk block has been updated, in response to requests received via a secure interface of the host system;

wherein the host system, in addition to the microcontroller, includes a processor configured to execute an operating system, and an external interface for an external server to access the host system;

wherein the secure interface and the external interface are different interfaces.

15. The non-transitory machine-accessible storage medium of claim 14 further comprising
instructions configured to:
determine a file targeted by the write command;
identify a set of disk blocks corresponding to the file;
determine whether at least one disk block in the set of disk blocks is in the list of protected disk blocks; and
determine that the write command attempts to write to the disk block in the list of protected disk blocks when the at least one disk block is in the list of protected disk blocks.

16. The non-transitory machine-accessible storage medium of claim 14 further comprising instructions configured to:
receive a request to remove the requested disk block from the list of protected disk blocks via the secure interface; and
remove the requested disk block from the list of protected disk blocks in response to the request.

17. The non-transitory machine-accessible storage medium of claim 14 wherein
the secure interface is inaccessible to software running on the processor.

18. The non-transitory machine-accessible storage medium of claim 14 wherein
the secure interface is accessible only to a management console that is external to the host system.

19. The non-transitory machine-accessible storage medium of claim 16 further comprising:
instructions configured to:
add the requested disk block back into the list of protected disk blocks after the requested disk block is updated.

* * * * *